US012642169B2

(12) United States Patent     (10) Patent No.:   US 12,642,169 B2
Cigarini                         (45) Date of Patent:       Jun. 2, 2026

(54) HEAD FOR BRUSH CUTTERS

(71) Applicant: TECOMEC S.R.L., Reggio Emilia (IT)

(72) Inventor: Enrico Cigarini, Reggio Emilia (IT)

(73) Assignee: TECOMEC S.R.L., Reggio Emilia (IT)

( * ) Notice: Subject to any disclaimer, the term of this patent is extended or adjusted under 35 U.S.C. 154(b) by 480 days.

(21) Appl. No.: 18/305,717

(22) Filed: Apr. 24, 2023

(65)          Prior Publication Data

US 2024/0349643 A1      Oct. 24, 2024

(51) Int. Cl.
*A01D 34/73*          (2006.01)

(52) U.S. Cl.
CPC ................................. *A01D 34/733* (2013.01)

(58) Field of Classification Search
CPC ............................ A01D 34/733; A01D 34/736
See application file for complete search history.

(56)               References Cited

U.S. PATENT DOCUMENTS

| | | | | |
|---|---|---|---|---|
| 5,430,943 | A * | 7/1995 | Lee | A01D 34/73 |
| | | | | 30/276 |
| 2007/0180706 | A1 | 8/2007 | Guerra | |
| 2008/0010836 | A1* | 1/2008 | Iacona | A01D 42/005 |
| | | | | 30/122 |
| 2010/0071338 | A1* | 3/2010 | Yanke | A01D 34/733 |
| | | | | 16/404 |
| 2010/0083506 | A1 | 4/2010 | Bennett | |
| 2011/0232109 | A1* | 9/2011 | Strader | A01D 34/736 |
| | | | | 30/347 |

| | | | | |
|---|---|---|---|---|
| 2012/0260508 | A1* | 10/2012 | Duvall | A01D 34/733 |
| | | | | 30/347 |
| 2017/0118911 | A1* | 5/2017 | Jerez | A01D 34/733 |
| 2019/0021225 | A1* | 1/2019 | Cigarini | A01D 34/733 |
| 2019/0261556 | A1* | 8/2019 | Jerez | A01D 34/4166 |
| 2020/0236847 | A1 | 7/2020 | Nolin et al. | |
| 2020/0352095 | A1* | 11/2020 | Jerez | A01D 34/733 |

FOREIGN PATENT DOCUMENTS

WO        2010040022        4/2010

OTHER PUBLICATIONS

Italian Search Report, issued Jul. 8, 2022, 8 pages.

* cited by examiner

*Primary Examiner* — Joseph M Rocca
*Assistant Examiner* — Jose Antonio Martinez
(74) *Attorney, Agent, or Firm* — Chrisman Gallo Tochtrop LLC

(57)          ABSTRACT

Head for brush cutter for cutting comprising cutting elements having a front cutting portion and a rear hooking portion, connectable to the head on a support body, provided with a central portion and a peripheral portion extending from the central portion radially around it. At the peripheral portion there are pins, engageable by the cutting elements, on which keys are active, connected to the central portion. Each key being engageable with a respective pin and movable from a first position, in which the key is in contact with the pin to which the key is facing, to a second position, in which the key is spaced apart from the pin generating a passage opening to allow the engagement of the cutting element on the pin. Elastic means are active on the pins and adapted to return the keys from the second position to the first position.

10 Claims, 7 Drawing Sheets

HEAD FOR BRUSH CUTTERS

The invention relates to a cutting head for brush cutter machines.

Brush cutter heads generally include one or more cutting elements which rotate integral with the head and cut vegetation due to the centrifugal force transmitted by the head to the cutting element and, consequently, the impact which the cutting element transmits to the vegetation.

Several cutting elements exist in the state of the art and, considering the most common, it is possible to mention: cutting wire, circular blade and blades.

A first cutting element known in the art is precisely the cutting wire. The cutting wire, generally made of plastic, can be anchored to the head in the form of segments or stored in the form of a skein with segments which exit through eyelets applied to the head. In both cases, the wire segments cut the vegetation and, if a segment breaks, the operator performs a replacement of the segment either manually or automatically.

This type of cutting element is preferred for cutting grass and more generally for vegetation without a lignified stem.

A second cutting element known in the art is the circular blade. This type of cutting element, generally made of metal, has a continuous cutting surface, in the case of a circular blade, or a discontinuous cutting surface, in the case of elements provided with two or more cutting cusps. This type of cutting element is preferred when the vegetation has small lignified stems, such as shrubs or brambles, and a particularly hard tool is necessary to perform the cut.

A third cutting element known in the art is the lamella i.e. blade, that is a long-shaped element, generally made of plastic, having the shape of a knife.

The blade has a substantially rectangular shape, with a predominant extension in length with respect to width and thickness, and includes a pair of opposite cutting surfaces. It is therefore possible to divide the blade into two portions: a front one provided with two sharp sides and a rear one provided with a section of engagement with the head. This type of cutting element is preferred by some users for their intermediate rigidity, in fact having an intermediate hardness between the wire and the circular blade, which gives the tool a flexibility of use.

However, the technology related to blade cutting elements is not lacking disadvantages.

Firstly, each manufacturer who plans to provide the head with blades must provide it with multiple safety systems for the constraint of the blade to the pin. A first constraint is made through the coupling between the hole, present on the cutting element, and the pin, present on the head. This coupling prevents the centrifugal force from causing the cutting element to disengage, projecting it away from the head. That is, this coupling provides a constraint along a radial direction which passes from the centre of the head to the outside thereof.

In order for the blades to be safely coupled with the head, it is a good practice to provide a further safety system which can retain the blade in the event of an axial thrust, i.e., along a direction parallel to the rotation axis of the head. These supplementary safety systems are very complicated to activate or deactivate. Solutions exist which adopt on the blade a coupling end portion with a hook conformation which can be coupled to a pin trapped between two shells defining the head. In this example, the hooking is therefore provided inside an opening obtained between the two shells. This configuration, in addition to not being easy to access during the coupling between the cutting element and the pin, cannot be easily inspected either to determine whether the blade has been correctly hooked or only partially hooked.

Another solution is described in document WO2010040022 in which pins are present which are movable from a disengaged position, adapted to allow the insertion of the blade, to an engaged position, where the insertion of the blade in the head is allowed until the pin also engages the hole of the blade.

Again, also in this conformation, it is not immediate to understand if the movable pin has correctly intercepted the hole of the blade and therefore if the blade is properly secured to the head.

Both solutions then suffer from the problem of the undesired release of the cutting element. In fact, if the cutting element undergoes an impact, this can induce a bending in the blade which can transform into a lifting of the blade from the pin and therefore a potential disengagement of the cutting element from the respective pin.

To this it should be added that for the solutions described above, during the replacement of the blades, the operator holds the blade to be replaced with one hand and the overturned brush cutter with other hand, or with the motor placed on the ground and with the head facing the sky. In this context, it is difficult to disarm the safety systems to allow the hooking of the blades.

An object of the present invention is to provide a head for brush cutters capable of overcoming the drawbacks mentioned above.

In particular, it is an object of the present invention to provide a brush cutter head which is capable of providing a safety system for blade-shaped cutting elements and even more particularly which are capable of providing a correct constraint to the radial and axial thrusts to which the blades are subjected during working operations.

A further object of the present invention is to provide a head for brush cutters which is capable of providing a safety system for blade-shaped cutting elements which is easy to arm and easy to deactivate.

Furthermore, the object of the present invention is to provide a brush cutter head which has a safety system which, if the cutting element impacts an obstacle, it is capable of absorbing the impact of the shock, keeping the cutting element in safety or preventing it from being released from the fixing pin.

To this end, the object of the invention is to define a cutting head for a brush cutting machine, according to claim 1.

The dependent claims correspond to possible embodiments of the invention.

Further features and advantages of the present invention will become more apparent from the following indicative and therefore non-limiting description, of a preferred but not exclusive embodiment of a brush cutter head as illustrated in the accompanying drawings in which:

FIG. 4 and FIG. 4A illustrate, respectively in perspective view and in transversal section, a first transient for loading a cutting element on the head of FIG. 1;

Figure 1:
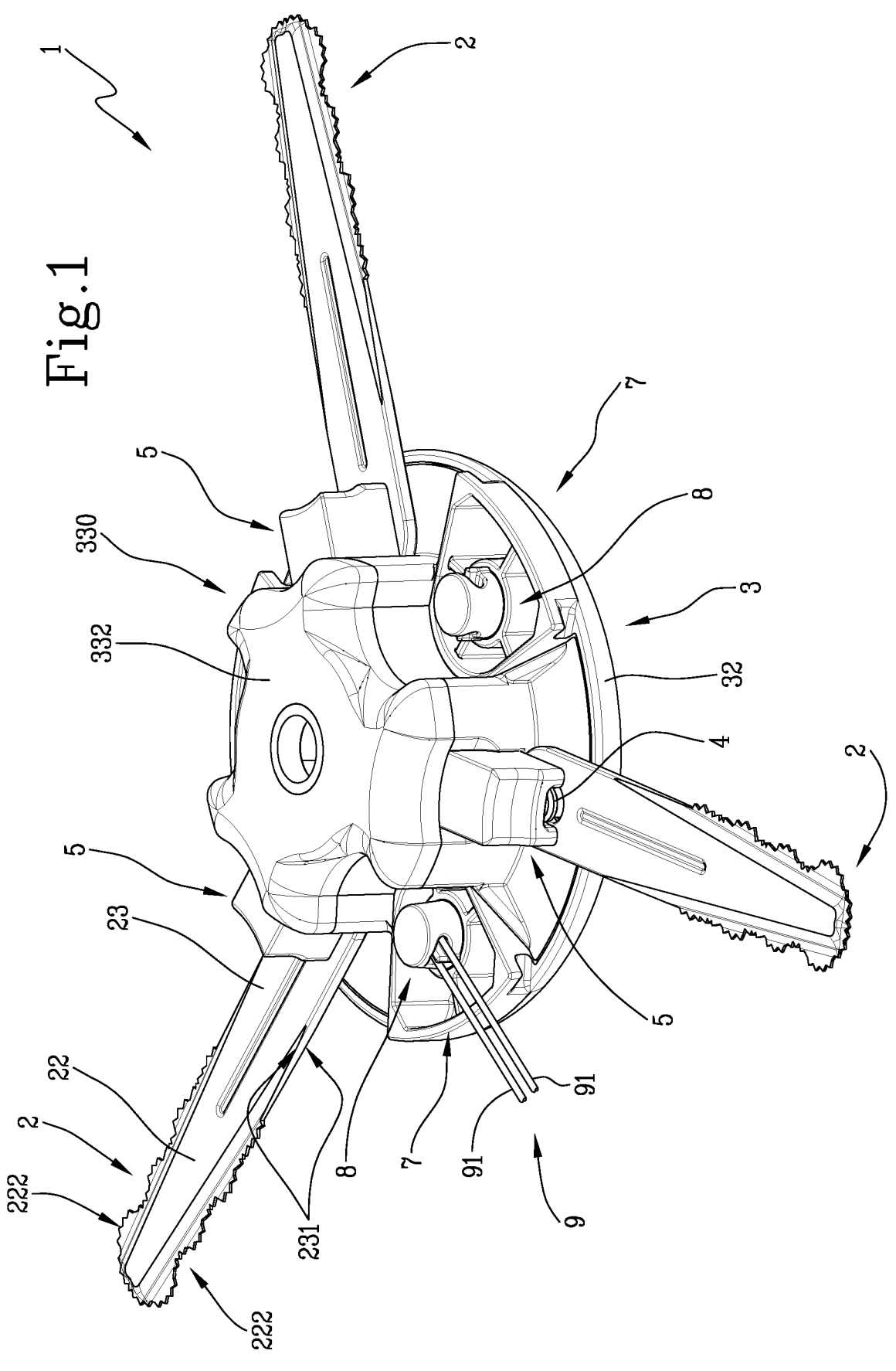
FIG. 1 is a perspective view of a head for brush cutters in accordance with the present invention.
Figure 2:
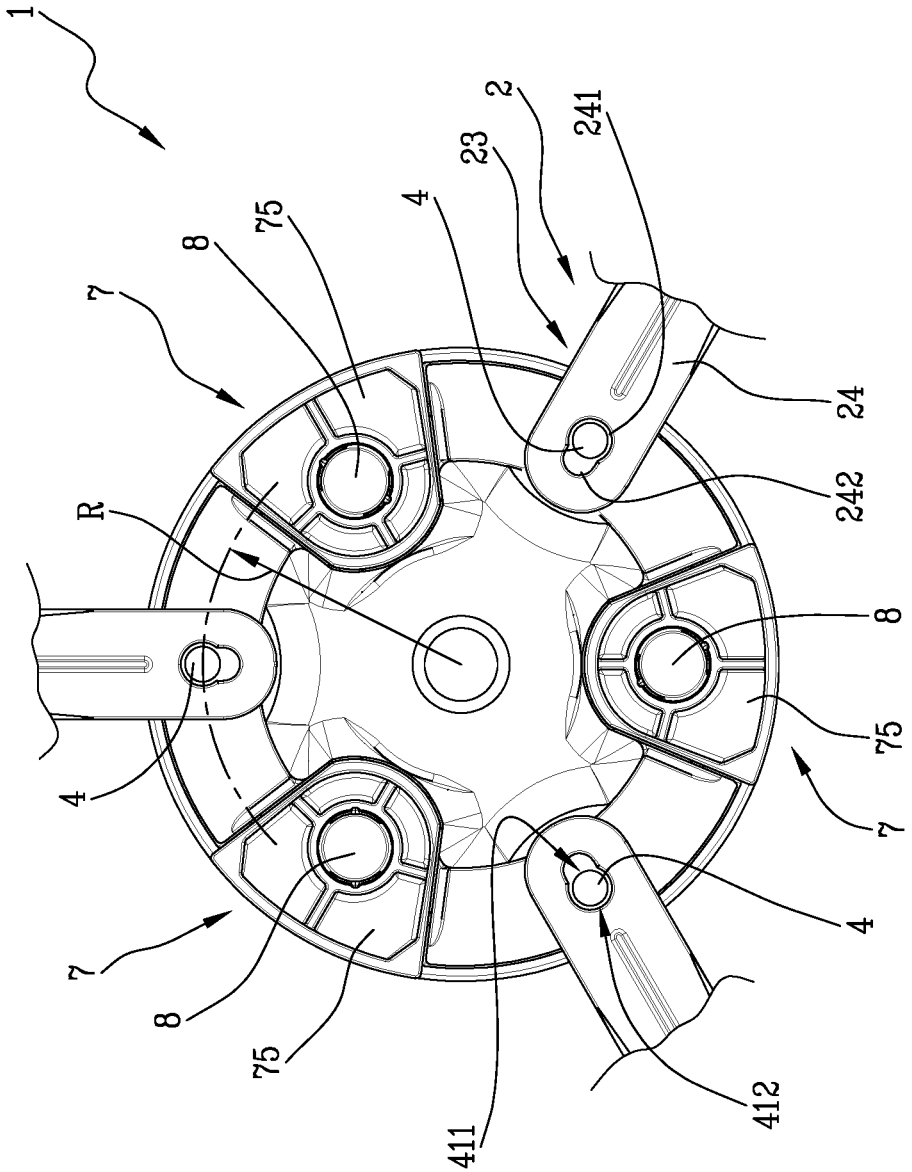
FIG. 2 is a plan view of the head of FIG. 1 with some parts removed to better highlight others.

With reference to the accompanying figures, the number 1 indicates overall a head for brush cutters adapted to cut grass and herbaceous plants.

The head 1 can be associated with a brush cutter, which is substantially known and therefore not illustrated, through a drive shaft. The drive shaft, receiving a rotary motion transmitted by a combustion engine or electric motor, transmits the rotary motion to the head 1 which rotates around its axis of symmetry Y.

Said head 1 is designed to work with, in addition to the wire cutting elements, with cutting elements 2 of the blade type, or blade cutting elements, which will be better described in the following of the present description.

The head 1 has a support body 3 having a central portion 31, connectable to the drive shaft, and a peripheral portion 32 having a substantially disc-shaped conformation and extending from the central portion 31 radially around it.

Figure 3:
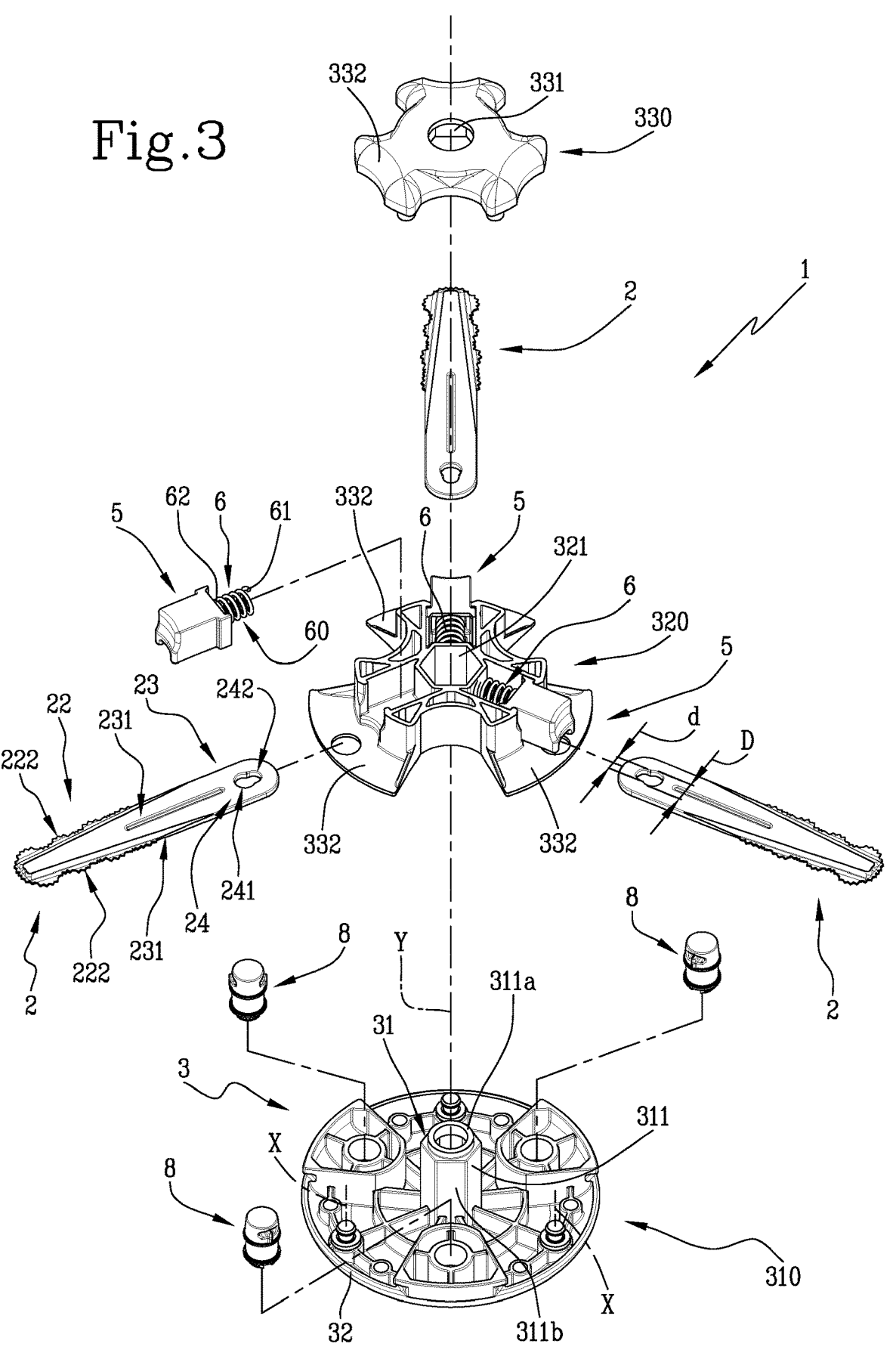
FIG. 3 is an exploded view of the head of FIG. 1.

As can be seen in FIG. 3, the support body 3 consists of three elements: a base element 310, an intermediate element 320 and a top element 330.

The base element 310 comprises the central portion 31, defined by a tubular body 311, provided above with a free end 311a and below with a base end 311b, externally having a shaped profile. From the base end 311b the peripheral portion 32 extends which takes the shape of a discoidal body concentric to the central portion 31.

The intermediate element 320, fitted on the base element 310, has a central sleeve 321, having a shape which is counter-shaped to that of the tubular body 311, from which a plurality of fins 322 radially extend each having a planar extension.

Due to the shape of the central sleeve 321 counter-shaped to the shape of the tubular body 311, when the intermediate element 320 is fitted on the base element 310, coupling the central sleeve 321 on the tubular body 311, the intermediate element 320 becomes integral with the base element 310, i.e., it cannot rotate with respect to the base element 310. As can be seen from the accompanying drawings, the central sleeve 321 and the tubular element 311 have a hexagonal transversal section.

The top element 330 is present as a closure of the support body 3. The top element 330 has a central tubular projection 331, which can be inserted axially inside the central sleeve 321, and externally a bell-shaped body 332 which closes like a package the intermediate element 320 on the base element 310. The tubular projection 331 also has a hexagonal transversal section to stably couple, so as to avoid any relative movement, to the central sleeve 321.

The support element 3 is arranged to receive in connection a plurality of cutting elements 2 of the blade type which can also be defined as blade cutting elements.

As can be seen in FIG. 1, the support element 3 can include a plurality of cutting elements 2 of the blade type and can also include a second plurality of cutting elements 9 preferably of the cutting wire type 91.

With particular reference to the plurality of cutting elements 2, each cutting element 2 has a substantially elongated shape having greater extension in length with respect to the width and thickness of the element.

Each cutting element 2 has a cutting front portion 21, defined by an elongated section 22 having two cutting surfaces 222 on the opposite sides, and a rear hooking portion 23, connectable to the head due to a slotted section 24.

In particular, the rear hooking portion 23 has a pair of flat surfaces 231 on opposite sides while the slotted section 24 consists of a first hole 241 and a second hole 242 intersecting the first hole 241. With reference to the slotted section 24, the first hole 241 has a first diameter D while the second hole 242 has a second diameter d, the first diameter D being greater than the second diameter d.

The plurality of cutting elements 2 can be engaged on a plurality of pins 4 so that a corresponding cutting element 2 is coupled to each pin 4. In particular, each pin 4 is engageable to a respective cutting element 2, fitting the pin 4 inside the slotted section 24.

In the accompanying drawings, a preferred shape of the head 1 is illustrated in which the plurality of cutting elements 2 is defined by a triplet of cutting elements and the plurality of pins 4 is defined by a triplet of pins 4 offset radially from each other at 120° one from the other with respect to the axis Y.

The plurality of pins 4 is radially distributed on the peripheral portion 32 of the support body 3 on a circumference having radius R and centre at the axis Y.

Each pin 4 has an extension which continues away from the peripheral portion 32 following an extension axis X. As can be seen in the accompanying drawings, the extension axes X are parallel to each other, being oriented vertically when the head 1, and in particular the peripheral portion 32, is resting on a horizontal surface.

Each pin 4 has a substantially cylindrical conformation defining an outer surface 41 having a first side 411, facing the central portion 31, and a second side 412, facing outwards of the head 1.

Figures 7, 8:
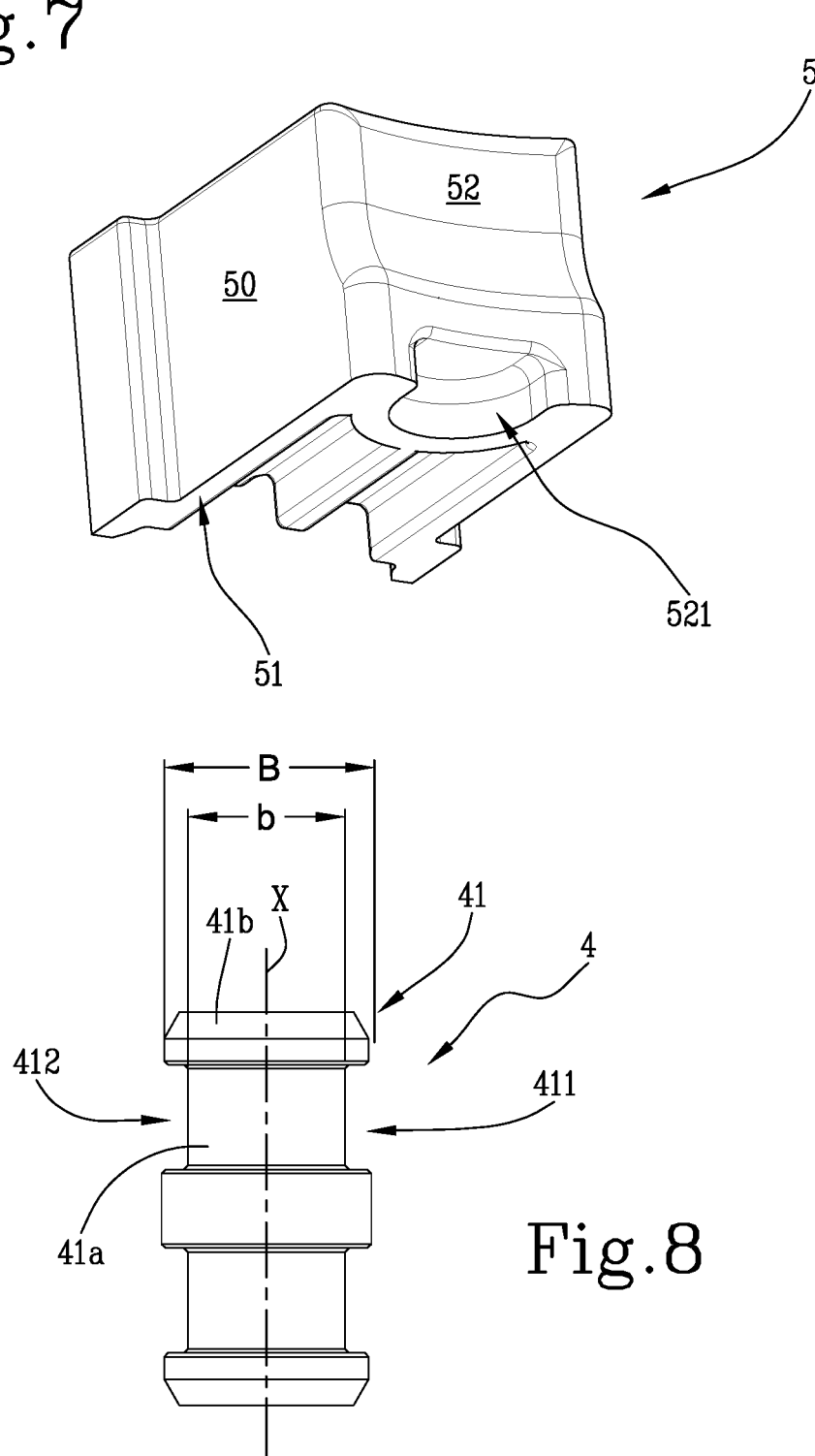
FIGS. 7 and 8 illustrate two detailed views of two respective components of the head of FIG. 1.

More in particular, each pin 4, better illustrated in FIG. 8, has a substantially cylindrical conformation defining a cylindrical section 41a, placed in connection with the peripheral portion 32, and a section enlargement 41b which continues the cylindrical section 41a. Even more in particular, the cylindrical section 41a has a first diameter b and the section enlargement 41b has a second diameter B, the second diameter B being greater than the first diameter b.

Referring to the slotted section 24, the second diameter B of the second cylindrical section 41b is slightly smaller with respect to the first diameter D of the first hole 241. Thereby, the insertion of the cutting element 2 on the pin 4 is facilitated. In addition, the second diameter d of the second hole 242 is substantially equal to the first diameter b of the second cylindrical section 41b. This promotes a geometric coupling between the cutting element 2 and the pin 4, during the rotation of the head, generating a first safety constraint.

In fact, as soon as the head 1 is rotated, the centrifugal force induces the cutting elements 2 to push the head 1 outwards or away from the axis Y.

In this context, the second diameter d of the second hole 242 reaches abutment on the first diameter b of the cylindrical section 41a. As a result of the fact that second diameter d and first diameter b are substantially equivalent, the cutting element abuts on the cylindrical section 41a of the pin 4.

There is a plurality of keys 5 at the central portion 31. Each key 5 is engageable with a respective pin 4 so as to constrain the cutting element 2 associated with the pin 4.

Each key 5 is movable from a first position, in which the key 5 is in contact with the side 411 of the pin to which it is facing, to a second position, in which the key 5 is spaced apart from the side 411 generating a passage opening, between pin 4 and key 5, such as to allow the insertion of the cutting element 2 on the pin 4 due to the insertion of the slotted section 24 on the pin 4.

The movement of each key 5, from the first to the second position and vice versa, occurs along a radial trajectory passing through the axis Y of the support body 3.

Such movement is generated by a pressure promoted by the operator on the key 5 near the pin 4 on which the cutting element 2 is to be replaced.

Figure 4:
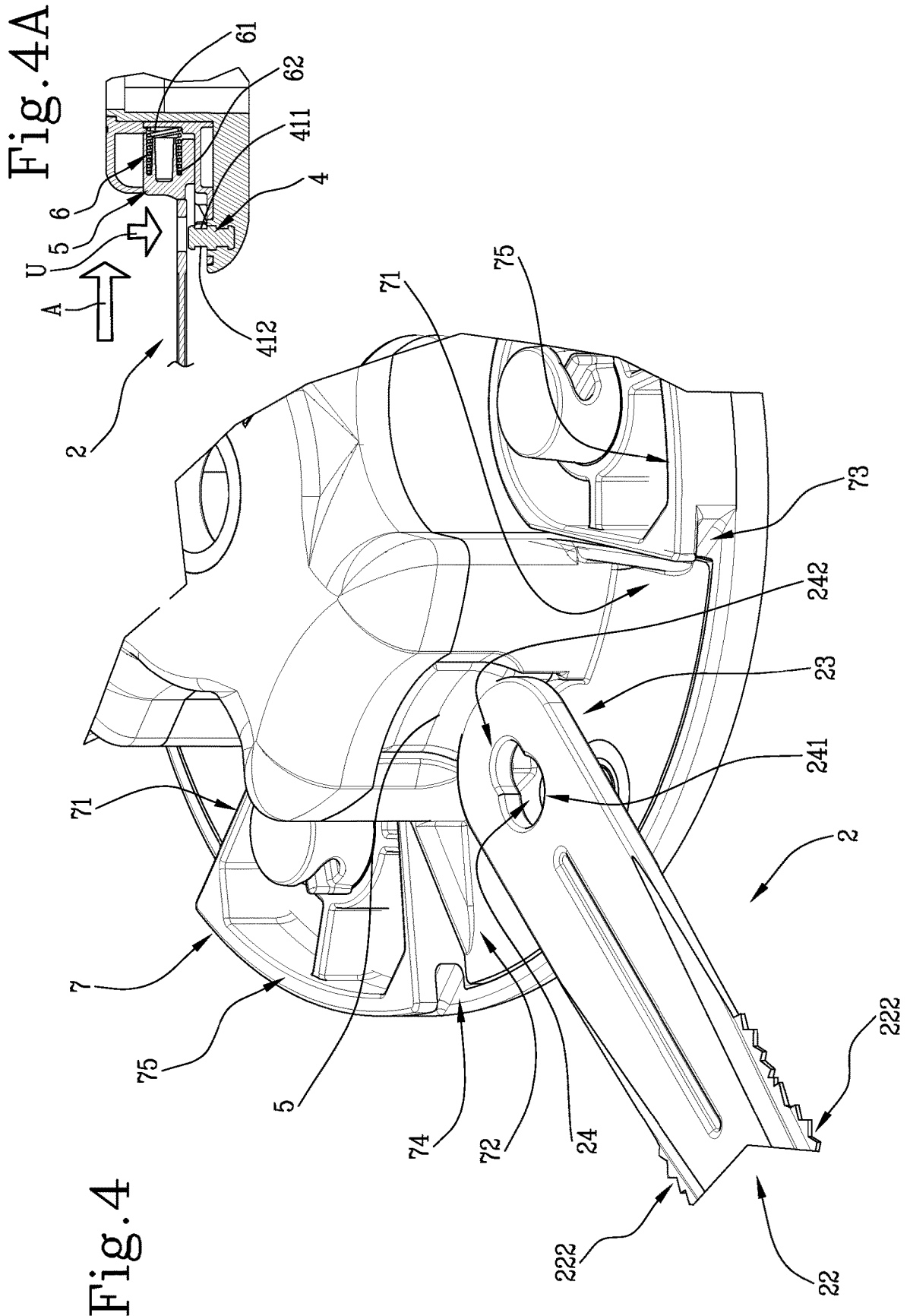

The pressure can be actuated manually by the operator by pressing the key 5 directly with his fingers or by pushing the rear hooking portion 24 against the key 5. FIGS. 4 and 4A illustrate a first assembly transient of the cutting element 2 during which it is pushed against the respective key 5 along a direction indicated in FIG. 4A with the arrow A.

In the latter case, it is understandable how the insertion of the cutting element 2 is facilitated since during the translation of the cutting element 2 against the key 5, as soon as the slotted section 24 is positioned above the pin 4, the cutting element 2 is fitted on the respective pin 4 following a direction indicated in FIG. 4A with the arrow U.

Each key 5 is defined by a prismatic body 50, having a substantially parallelepiped shape, having a bottom wall 51 which is raised with respect to the peripheral portion 32. That is, each key 5 is raised with respect to the peripheral portion 32 so as to define a passage therebetween. Inside said passage, the rear hooking portion 24 is seated which is therefore retained, above by the bottom 51 of the key and below by the peripheral portion 32 as illustrated in FIG. 3.

Through this assembly configuration of the cutting elements 2 it is possible to provide a safety constraint against the release of the cutting elements 2 from the respective pins 4. In fact, if a cutting element 2 were to receive an impact, i.e., a direct thrust in a direction parallel to the axis Y, it would be impossible for the cutting element to lift, therefore, to decouple from the pin 4 to which it is connected, being trapped between the peripheral portion 32 and the bottom wall 51 of the key (see FIGS. 5 and 5A).

In addition to the bottom wall 51, each key 5, has a front wall 52 adapted to enter into abutment with the first side 411 of the pin 4 to which the key 5 is facing. The front wall 52 then has a recess 521 so that when the key is abutted on the pin 4, it is incorporated inside the key 5. That is, the recess 52 favours the definition of a housing within which the pin 4 is placed when the key 5 is in the second position.

The movement of the plurality of keys 5 is counteracted by a plurality of elastic means 6 distributed so that a respective elastic means 6 is active on each key 5.

Figures 5, 5A:
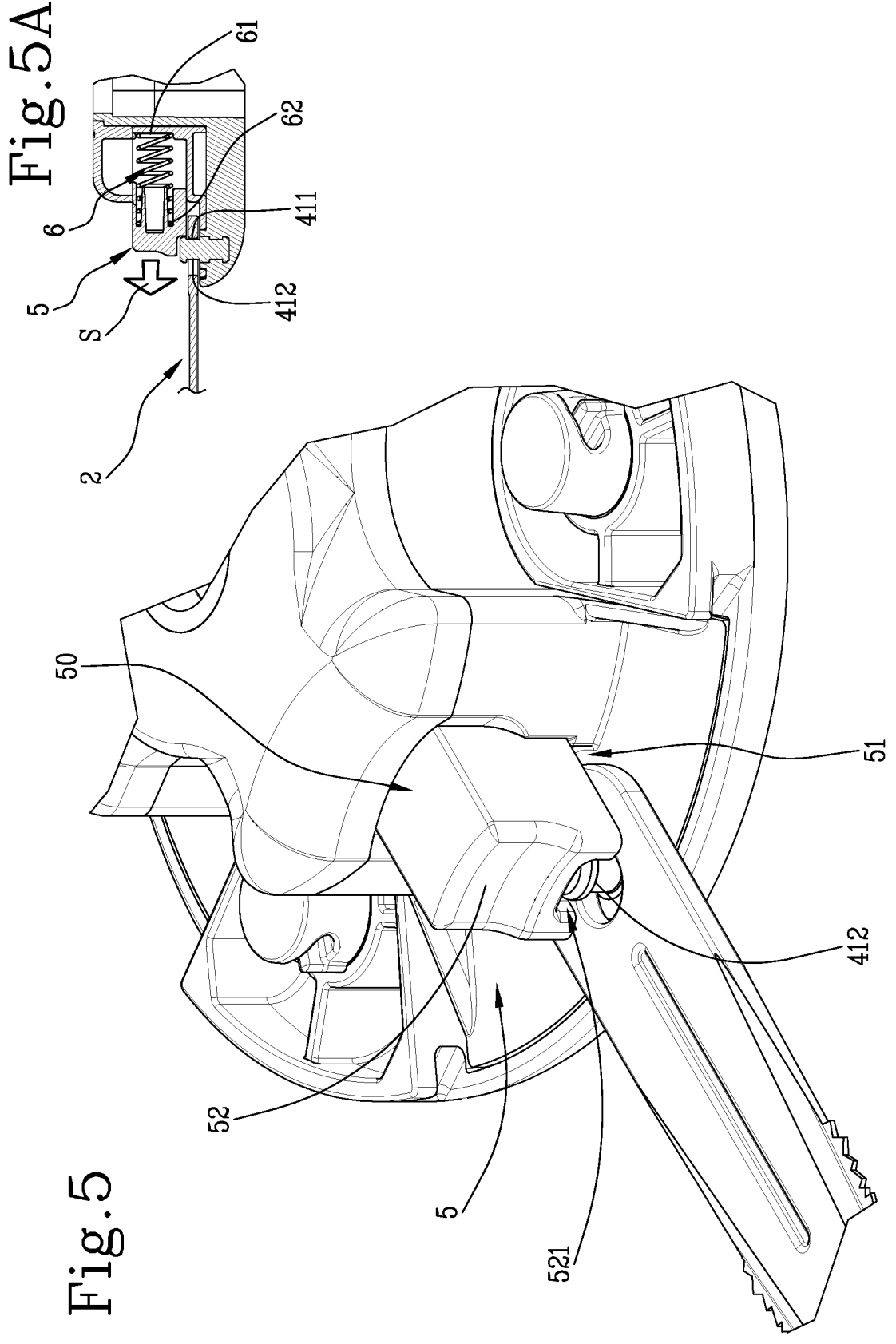
FIG. 5 and FIG. 5A illustrate, respectively in perspective view and in transversal section, a second transient for loading the cutting element on the head of FIG. 1.

The plurality of elastic means 6, in addition to counteracting the movement of the plurality of keys 5 from the first to the second position, returns the plurality of keys 5 from the second position to the first position generating a thrust, indicated in FIG. 5A with the arrow S, on the respective key 5 to which the elastic means 6 is associated so that the latter abuts on the respective pin 4 to which it is facing.

As can be seen from FIGS. 3, 4A and 5A, each elastic means 6 is preferably defined by a helical spring 60 having a first end 61 abutting on the central portion 31 of the support body and a second end 62 abutting on a respective key 5, at a portion of the key 5 opposite that which abuttingly pushes against the pin 4.

The head 1 and in particular the support body 3 further includes a plurality of ridges 7, arranged on the peripheral portion 32 and interspersed with the plurality of pins 4.

Each ridge 7 has a circumferential sector shape and includes at least a first side 71, a second side 72 and a connecting wall 75 which connects the aforementioned sides 71, 72.

As can be seen in the accompanying drawings, the plurality of ridges 7 is radially distributed on the peripheral portion 32 so that each ridge 7 is spaced by 120° from a contiguous ridge. By comparing the plurality of pins 4 and the plurality of ridges 7 it is possible to note how the plurality of pins 4 is offset with respect to the plurality of ridges 7 by 60°.

With this specific geometric construction, each pin 4 has on one side a ridge 7 and on the other side another ridge 7. In other words, each ridge 7 has the first side 71 facing a pin 4 and a second side 71 facing another pin 4.

There is a slit on each side of the ridge 7 and in particular on the first side 71 there is a first slit 73 and on the second side 72 there is a second slit 74.

Also by virtue of the geometric arrangement of the plurality of ridges 7, each cutting element 2 has a cutting surface 222 facing the first slit 73, belonging to a ridge 7, and the second cutting surface 222 facing a second slit 74, belonging to another ridge 7 adjacent to the previous one.

The slits 73 and 74 of each ridge 7 can be alternatively engaged by a cutting surface 222 of the cutting elements 2.

Figure 6:
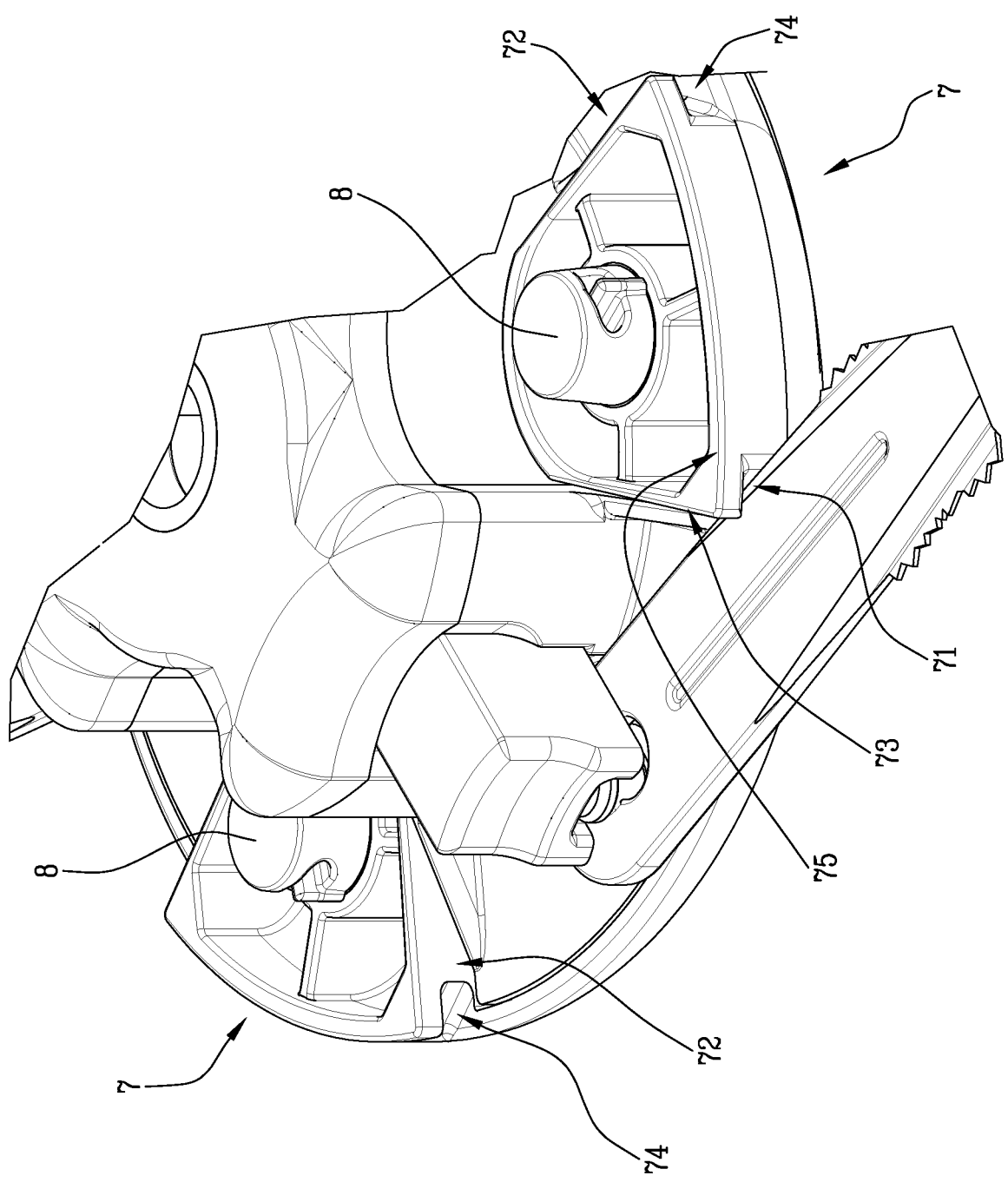
FIG. 6 illustrates a partially interrupted perspective view of an operating transient of FIG. 1.

If a cutting element 2 receives, during the operation of the head 1, an impact, this induces a rotation to the cutting element with opposite direction to that of rotation of the head 1. The cutting element 2, absorbing the impact, rotates until it reaches the inside one of the slits 73 or 74 depending on the direction of the impact. When the cutting element 2 enters inside the slit, transient shown in FIG. 6, a further safety element of the head 1 is activated. In fact, once the impact has been received, the cutting element moves to a position in which it has the front cutting portion 21 inside the slit 73 or 74 while the rear hooking portion 24 remains constrained between peripheral portion 32 and key 5.

Thereby, the axial thrust generated by the impact on the cutting element generates a bending moment on the cutting element which causes the curvature of the cutting element, avoiding a rotation thereof with respect to the connecting pin 4 which could facilitate its disengagement from the pin 4.

Thereby, the cooperation of the slits 72 and 74, for the front cutting portion 21, and the interception system, acting on the rear hooking portion 23 and obtained between the bottom wall 51 and the peripheral portion 32, favours a curvature of the cutting element 2 avoiding its release from the pin 4 to which the cutting element 2 is coupled.

As can be seen in the accompanying drawings, each ridge 7 further has a plurality of retaining elements 8 connected to the ridge at the junction wall 75.

Each retaining element 8 is fitted with a further cutting element 9 preferably defined by a cutting wire 91 folded on itself.

Since the retaining element 8 and the further cutting element 9 are known in the field of brush cutter heads, this assembly of components is not further described.

The assembly of the plurality of retaining elements 8 and the plurality of pins 4 with the respective cutting elements is provided and illustrated in the accompanying tables only to highlight the possibility of applying an additional cutting system to that of the blade elements given the free space which is generated above the junction wall 75 of each ridge 7.

The present invention achieves the set objects since it is simple in the installation or replacement of the cutting elements and provides valid safety systems capable of preventing, during the operation of the head 1, the disengagement of a cutting element 2 from the respective coupling pin 4.

In particular, the configuration of the keys 5 allows a quick and effective assembly by pushing the cutting element 2 against the key itself and without therefore activating or deactivating particular safety systems. In other words, the operator, holding the brush cutter or the head 1 with one hand and a cutting element 2 with the other hand, can easily and safely carry out the replacement.

Furthermore, the pins 4 are not covered by casings or other elements and therefore the operator has an immediate visual control on the correct installation of the cutting element.

Finally, the retaining system of the rear hooking portion 24, given by the cooperation of the bottom wall 51 of the button 5 and the peripheral portion 32 of the support body 3, and of the front cutting portion 21, given by the first or second slit 73, 74, counteracts the disengagement of the cutting elements 2 during the rotation of the support body 3 favouring a bending of the cutting element 2 which has received the impact.

The invention claimed is:

1. A head (1) for brush cutter for cutting grass and herbaceous plants, the head comprising:
  a plurality of cutting elements (2) and each having a front cutting portion (21), defined by an elongated section (22), and a rear hooking portion (23), connectable to the head (1) due to a slotted section (24);
  a support body (3), engageable with a drive shaft of a brush cutter to rotate around an axis of symmetry (Y) of the support body (3), having a central portion (31), connectable to the drive shaft, and a peripheral portion (32), having a substantially disc-shaped conformation extending from the central portion (31) radially around it;
  a plurality of pins (4), engageable by the plurality of cutting elements (2) through the insertion of the slotted section (24) of a respective cutting element (2) on a corresponding pin (4), radially distributed on the peripheral portion (32); each pin (4) having at least one outer surface (41) having a first side (411) facing the central portion (31);
  a plurality of keys (5) connected to the central portion (31) of the support body (3); each key (5) being engageable in contact with a respective pin (4) and movable, under the activation by an operator, from a first position, in which the key (5) is in contact with the side (411) of the pin (4) to which the key (5) is facing, to a second position, in which the key (5) is spaced apart from the side (411) generating a passage opening adapted to allow the engagement of the cutting element (2) on the pin (4) due to the insertion of the slotted section (24) on the pin (4);
  a plurality of elastic means (6), active on the plurality of keys (5) and adapted to return the plurality of keys (5) from the second position to the first position once the action induced by the operator has ceased,
  wherein each key (5) is defined by a prismatic body (50) having a bottom wall (51) which is spaced apart from the peripheral portion (32); said rear hooking portion (23) being retained, when the key (5) is in the first position, between the bottom wall (51) and the peripheral portion (32).

2. The head (1) for brush cutter according to claim 1, wherein each key, belonging to the plurality of keys (5), moves from the first position to the second position and vice versa according to a radial trajectory passing through the axis (Y) of the support body (3).

3. The head (1) for brush cutter according to claim 1, wherein the plurality of pins (4) is radially distributed on a circumference having radius (R) and centre at the axis (Y); each pin (4) having an extension axis (X) thereof.

4. The head (1) for brush cutter according to claim 1, further comprising a plurality of ridges (7) arranged on the peripheral portion (32) and interspersed with the plurality of pins (4) so that each ridge (7) has a first side (71) facing a pin (4) and a second side (72), opposite the previous one, facing another pin (4); said plurality of ridges (7) being a pair of two facing a pin (4) to limit the rotation of a respective cutting element (2) around the pin (4) to which the cutting element (2) is coupled.

5. The head (1) for brush cutter according to claim 4, wherein each ridge (7) comprises on the first side (71) a first slit (73) and on the second side (72) a second slit (74); said first and second slits (73,74) being engageable, if the cutting element (2) undergoes an impact, alternatively, depending on the direction of rotation induced by the impact to the cutting element (2), from the front cutting portion (21) so as to retain the cutting element (2) absorbing any axial thrusts received during the impact.

6. The head (1) according to claim 4, wherein said plurality of ridges (7) has a plurality of retaining elements (8) each mounting a further cutting element (9) that is a cutting edge (91).

7. The head (1) according to claim 1, wherein each prismatic body (50) has a front wall (52) adapted to abut against the first side (411) of the pin (4) to which the button (5) is facing; said front wall (52) having a recess (521) within which the pin (4) is housed when the button (5) is in the second position.

8. The head (1) according to claim 1, wherein said elastic means (6) is defined by a plurality of helical springs (60), one for each key of the plurality of keys (5), each helical spring (60) having a first end (61) abutting on the central portion (31) of the support body (3) and a second end (62) abutting on a respective key (5) on which the helical spring (60) is active.

9. The head (1) according to claim 4, wherein said plurality of pins (4) is defined by a triplet of pins radially distributed at 120° one from the other and said plurality of ridges (7) is defined by a triplet of pins radially distributed at 120° one from the other; said plurality of ridges (4) being offset with respect to the plurality of ridges (7) by 60°.

10. The head (1) according to claim 1, wherein each pin (4) of said plurality of pins (4) is fixedly attached to the peripheral portion (32).

* * * * *